(12) United States Patent
Doneux et al.

(10) Patent No.: US 7,874,402 B2
(45) Date of Patent: Jan. 25, 2011

(54) ACOUSTIC LAMINATE

(75) Inventors: Philippe Pierre Marie Joseph Doneux, 142 Young Street, Annandale, NSW (AU); Bela Takacs, Mt Riverview (AU)

(73) Assignee: Philippe Pierre Marie Joseph Doneux, New South Wales (AU)

( * ) Notice: Subject to any disclaimer, the term of this patent is extended or adjusted under 35 U.S.C. 154(b) by 784 days.

(21) Appl. No.: 11/629,676

(22) PCT Filed: Apr. 11, 2005

(86) PCT No.: PCT/AU2005/000521

§ 371 (c)(1),
(2), (4) Date: Jul. 20, 2007

(87) PCT Pub. No.: WO2005/124044

PCT Pub. Date: Dec. 29, 2005

(65) Prior Publication Data

US 2008/0116006 A1    May 22, 2008

(30) Foreign Application Priority Data

Jun. 17, 2004 (AU) ............................. 2004903270
Aug. 10, 2004 (AU) ............................. 2004904482
Nov. 22, 2004 (AU) ............................. 2004906645

(51) Int. Cl.
E04B 1/82 (2006.01)

(52) U.S. Cl. ...................... 181/290; 181/284; 181/286; 428/220; 428/297.4

(58) Field of Classification Search ................. 428/220, 428/297.1; 181/290, 286, 284
See application file for complete search history.

(56) References Cited

U.S. PATENT DOCUMENTS

| 2,807,595 | A  | * | 9/1957 | Brown ...................... 521/106 |
| 6,109,389 | A  | * | 8/2000 | Hiers et al. .................. 181/290 |
| 6,296,076 | B1 | * | 10/2001 | Hiers et al. .................. 181/290 |
| 2006/0154057 | A1 | * | 7/2006 | Nonninger .................. 428/364 |
| 2008/0116006 | A1 | * | 5/2008 | Doneux et al. .............. 181/286 |
| 2008/0121461 | A1 | * | 5/2008 | Gross et al. .................. 181/286 |

* cited by examiner

*Primary Examiner*—N. Edwards
(74) *Attorney, Agent, or Firm*—Davidson Berquist Jackson & Gowdey, LLP

(57) ABSTRACT

According to one aspect of the present invention there is provided an acoustic laminate including: a first layer of viscoelastic acoustic barrier material; a sound absorbing/decoupling batt affixed to the first layer of viscoelastic acoustic barrier material, the batt at rest defining a batt plane; the batt including a plurality of batt fibers; the batt further including retaining fibers, wherein the batt fibers and/or retaining fibers are disposed perpendicular to the batt plane and having end portions thereof disposed at a batt surface, the end portions affixed to the viscoelastic barrier material so that either the first layer of viscoelastic acoustic barrier material or the sound absorbing/decoupling batt itself may be retained in spaced relation from a mounting surface when the laminate is so mounted, the retention being achieved in any orientation by bearing a mass load of the batt or first layer of viscoelastic material along the axis of the affixed batt fibers and/or retaining fibers.

18 Claims, 4 Drawing Sheets

ACOUSTIC LAMINATE

FIELD OF THE INVENTION

The present invention relates generally to materials which attenuate incident acoustic energy or attenuate acoustic energy passing through the material. Some embodiments of the present invention have application as, or within laminate structures which increase the Transmission Loss (TL) of enclosures, walls, ceilings, floors and other dividing structures by reducing both the airborne and structural components of the TL. Other embodiments have application in incident noise attenuation to reduce acoustic wave reflection within an enclosure.

BACKGROUND TO THE INVENTION

Sound absorbing and decoupling material such as batts constructed from mineral fibre (rock wool), glass fibre, and polyester are often placed in a space between two dividing panels to absorb incident sound energy and reduce noise transmission from one side of the panel to another. Often the dividing structure is a single panel, and may be a ceiling panel, disposed generally horizontally. It is often the case that a layer of limp, dense material is adhered to one side, often the underside, of the batt, so that the limp layer "floats" on the batt with respect to the panel, providing a barrier to, and much reducing the energy of incident sound waves.

Over time, especially where the panel is a ceiling panel, and also in vertical wall installations, the mass of the limp layer or barrier tears the fibers of the batt away from their hold on each other. The barrier falls away, and any sound energy is subsequently less impeded from passing through the dividing structure. Heavy vibrations generally associated with high sound levels generally accelerate this process.

Also, transmission through dividing structures via structural vibration and reflection of energy from surfaces within an enclosure or space all combine to increase the $L_{eq}$ within the space, causing distractions to users of the space.

The present invention seeks to ameliorate one or more of the abovementioned disadvantages.

SUMMARY OF THE INVENTION

According to one aspect of the present invention there is provided an acoustic laminate including: a first layer of viscoelastic acoustic barrier material; a sound absorbing/decoupling batt affixed to the first layer of viscoelastic acoustic barrier material, the batt at rest defining a batt plane; the batt including a plurality of batt fibers; the batt further including retaining fibers, wherein the batt fibers and/or retaining fibers are disposed perpendicular to the batt plane and having end portions thereof disposed at a batt surface, the end portions affixed to the viscoelastic barrier material so that either the first layer of viscoelastic acoustic barrier material or the sound absorbing/decoupling batt itself may be retained in spaced relation from a mounting surface when the laminate is so mounted, the retention being achieved in any orientation by bearing a mass load of the batt or first layer of viscoelastic material along the axis of the affixed batt fibers and/or retaining fibers.

Preferably, the end portions of the batt fibers and/or retaining fibers are embedded in the first layer of viscoelastic barrier material so as to improve retention of the first layer.

Preferably, the first layer of viscoelastic acoustic barrier material is in the form of strips spaced apart from one another along an axis of the batt plane so as to provide some effective damping when mounted against a mounting surface, and to reduce mass.

Preferably, the first layer of viscoelastic acoustic barrier material is in the form of pads spaced apart from one another across a matrix or grid in the batt plane so as to provide some effective damping when mounted against a mounting surface, and to reduce mass.

Preferably, the batt fibers are in the form of one or more folds or loops arranged along fold or loop axes of the batt plane into leaves, the or each fold or loop commencing at a first surface, extending towards the other surface and returning to the first surface, so that sound absorption and load bearing is carried out by the batt fibers.

Preferably, a plurality of leaves are arranged along a surface or between two surfaces, along an axis perpendicular to the fold or loop axis to form the or each batt.

Preferably, the batt fibers and retention fibers are constructed from mineral wool, glass fibre or polyester, or indeed any suitable absorptive material.

Preferably, the batt fibers are aligned parallel with the batt plane, and the retention fibers are formed from the batt fibers by needle-punching the batt fibers into the first layer of viscoelastic acoustic barrier material to become retention fibers.

Preferably, the first layer of viscoelastic acoustic barrier material is of a density of between approximately 1000 kg/m$^3$ to 3000 kg/m$^3$. However, it is preferred that the first layer of viscoelastic acoustic barrier material has a density of approximately 1470 kg/m$^3$.

Preferably, the first layer of viscoelastic acoustic barrier material has a surface density of approximately 2.5 kg/m$^2$.

Preferably, the first layer of viscoelastic acoustic barrier material has a thickness of below 6 mm. However, it is preferred that the first layer of viscoelastic acoustic barrier material has a thickness of approximately 1.7 mm.

Preferably, the first layer of viscoelastic acoustic barrier is constructed from a polymeric elastomer impregnated with any kind of particulate material. Preferably, the particulate material is calcium carbonate.

Preferably, the first layer of viscoelastic acoustic barrier material is a composition including water, gelatine, glycerine and a filler material.

Preferably, the composition includes:

| | |
|---|---|
| 5-40 wt % | water |
| 5-30 wt % | gelatine |
| 5-40 wt % | glycerine; and |
| 20-60 wt % | filler material. |

Preferably, the composition also includes 1 to 15 wt % of a group II metal chloride such as for example calcium chloride or magnesium chloride.

Preferably, the composition includes 2 to 10 wt % magnesium chloride.

Preferably, the composition includes 0.5 to 7 wt % starch or gluten.

Preferably, the starch is provided from the addition of cornflour to the composition.

Preferably, the filler material is a non-reactive material with a high density.

Preferably, the density of the filler material is greater than 1 g/cm$^3$.

Preferably, the density of the filler material is approximately 2.0 to 3.0 g/cm$^3$.

Preferably, the filler material may be chosen from any non-reactive material with a high density such as for example barium sulphate or KAOLIN.

Preferably, the composition includes:

| | |
|---|---|
| 10-25 wt % | water |
| 5-20 wt % | gelatine |
| 10-25 wt % | glycerine; |
| 40-60 wt % | filler material; |
| 1-10 wt % | magnesium chloride; and |
| 0.5-3 wt % | starch. |

Preferably, the composition includes constituents such as for example ethylene and/or propylene glycols; polyvinyl alcohols; deodorisers; anti-oxidants and/or fungicides.

Preferably, the Young's Modulus of the first layer of viscoelastic material is less than 344 kPa.

Preferably, the first layer of viscoelastic acoustic barrier material is faced on one side with a nonwoven polyester of thickness approximately 0.05 mm.

Preferably, on one side of the first layer of viscoelastic material there is provided an aluminium film reinforced with polyester as a water barrier and to provide some resistance for the laminate from fire damage.

Preferably, a second layer of viscoelastic acoustic barrier material is mounted on the other side of the laminate from the first layer of viscoelastic acoustic barrier material, the second layer to provide some structural damping to a mounting surface or structure.

Preferably, a spacer is provided on which a floor covering may "float" in order to reduce peak impact forces from footfalls, reducing structural vibration through, and reflection from the surfaces within an enclosure.

According to another aspect of the present invention there is provided a method for producing an acoustic laminate, the method including the steps of:

affixing a layer of viscoelastic acoustic barrier material onto a batt which has batt fibers and/or retaining fibers arranged perpendicular to a batt plane in which the batt is disposed at rest, so that ends of the batt fibers and/or retaining fibers at a surface of the batt plane are affixed to the layer of viscoelastic acoustic barrier material for retention thereof when the laminate is mounted in an overhead or vertical position.

Preferably, the step of affixing the first layer involves adhering the first layer to the batt.

Preferably, the step of affixing the first layer involves pouring the first layer onto the batt so that the ends of the batt fibers and/or retaining fibers are embedded in the first layer when it cures, providing improved retention of the first layer to the batt.

Preferably, the first layer is poured in spaced-apart strips along an axis of the batt plane or in a matrix of pads spaced across a batt surface plane.

DESCRIPTION OF THE PREFERRED EMBODIMENTS

In order to enable a clearer understanding of the invention, it will hereinafter be described with reference to drawings and description of preferred embodiments. In the drawings.

Figure 1:
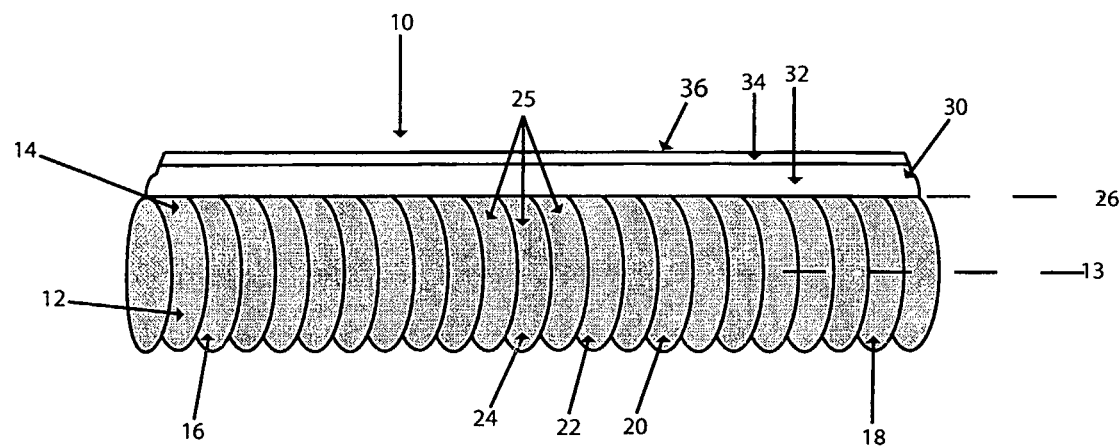
FIG. 1 is a side view of a laminate structure according to a preferred embodiment of the present invention.

Referring to FIG. 1 there is shown a first embodiment of acoustic-attenuating laminate generally indicated at 10 the laminate 10 including a batt 12 including a top surface 14 and a bottom surface 16. In its relaxed state the batt 12 adopts a flat plane 13, however, it is flexible enough to conform to convoluted surfaces (not shown) if pressed gently. The batt 12 includes a plurality of fibers 18 which are arranged so that major portions thereof lie perpendicular to the flat plane 13 when the batt is in a relaxed state.

The fibers 18 in the batt 12 are arranged into a plurality of loops or folds 20. Each loop or fold 20 commences at or near the top surface 14. Each fold or loop 20, in side elevation, is curved slightly, to form a fold or loop 20 in the shape of a crescent 22. This crescent 22 assists the batt to perform a sound-absorption function, without reducing to a great degree the axial load-bearing capability of the fibers 18.

Each fold or loop 20 is aligned along an axis 25 (into the page of FIGS. 1 and 2) to form leaves 24. To form the batt, a plurality of leaves 24 are arranged along an axis 26 in the plane of one of the top or bottom surfaces which is also perpendicular to the fold or loop 20 axis. The fibers 18 are constructed from polyester.

A first layer of viscoelastic acoustic barrier material 30 is provided in the embodiment shown, fixed by adhesive to the top surface 14 of the batt 12. The first layer of viscoelastic acoustic barrier material 30 is in the form of a limp material, being in this form a polymeric elastomer 32 impregnated with a material (not shown) in the form of calcium carbonate (not shown). The lamina 30 is approximately 1.7 mm thick, of density 1470 kg/m$^3$. In another embodiment the first layer of viscoelastic acoustic barrier material 30 is a composition including a mixture of water, gelatine, glycerine and a filler material, an example of which is described below in a non-limiting example.

A facing 34 is provided in the form of aluminium foil 36 to provide a degree of fire protection for the polymeric elastomer 32 and batt 12. The facing 34 is adhered to an upper surface of the first layer of viscoelastic acoustic barrier material 30.

Figure 2:
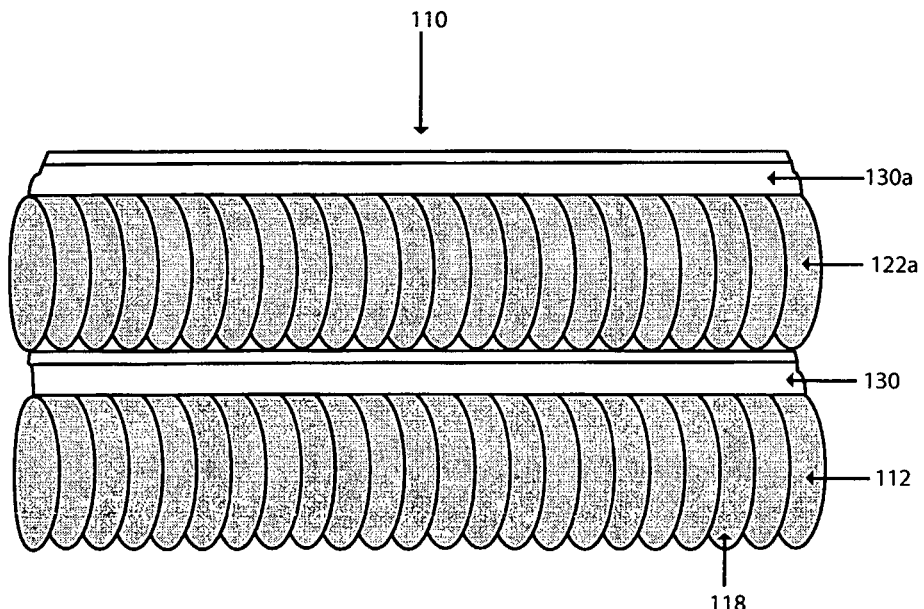
FIG. 2 is a side view of a laminate structure according to a second preferred embodiment of the present invention.

In FIG. 2, a similar arrangement to that shown in FIG. 1 is shown, however, the embodiment is a double-layer so that the first layer of viscoelastic acoustic barrier material 130 floats between two batts 112. Advantageously, the structure of preferred embodiments of the present invention allows these stackings because load-bearing is much improved over known batts. Like numerals between the Figures denote like features.

A second embodiment does not differ greatly in side view from that shown in FIGS. 1 and 2 and will be hereinafter described. A first layer 30 is applied to the batt 12 by being poured onto the top surface 14 of the batt 12. This allows the ends of the loops 20 at the top surface to be incorporated or embedded by the first layer 30 and are retained therein upon curing of the viscoelastic acoustic barrier 30. This improved retention of the layer 30 along the axes of the fibers.

In operation, when the laminate is installed on an overhead ceiling panel or even a vertical wall (not shown), the layer 30 is spaced from the panel by the batt, and the tendency for the mass of the first layer of viscoelastic acoustic barrier material 30 to tear the fibers 18 away from each other and the wall is reduced. This is because the fibers 18 support the mass of the first layer of viscoelastic acoustic barrier material 30 along their axis—an efficient mode of support, at a lower cost than other materials.

The first layer 30 is in one form in the form of strips of pads and is affixed to the batt and mounted to the mounting surface, so that the mounting surface is damped.

Figure 3:
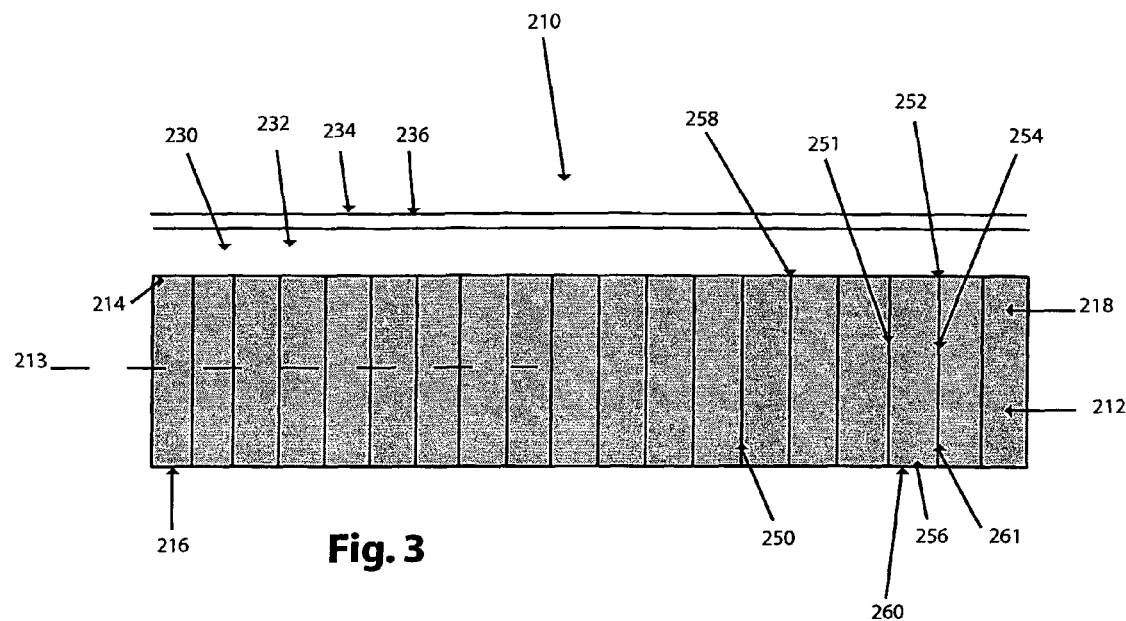
FIG. 3 is a side view of a laminate structure according to a third preferred embodiment of the present invention.
Figure 4:
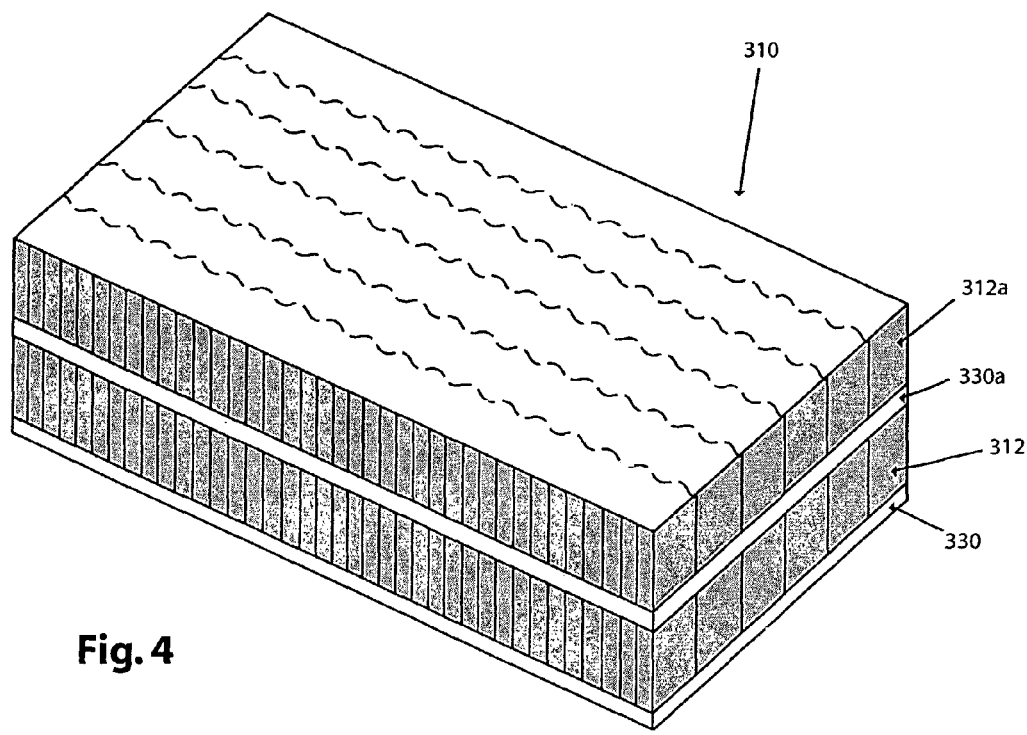
FIG. 4 is an isometric view of a fourth preferred embodiment of the present invention.

Referring to FIGS. 3 and 4 there is shown laminate structures according to preferred embodiments of the present invention. Firstly turning to FIG. 3, a laminate structure 210 is shown, the structure 210 including a batt 212 having a top surface 214 and a bottom surface 216. In its relaxed state the batt 212 adopts a flat plane 213, however, it is flexible enough to conform to slightly convoluted surfaces (not shown) if pressed gently. The batt 212 includes a plurality of fibers 218 which are arranged to lie parallel to the flat plane 213 when the batt 212 is in a relaxed state. The fibers 218 are constructed from polyester.

Retaining means 250 are provided to grasp a plurality of fibre sections together. The retaining means 250 includes an anchor portion 252, one or more leg portions 254 and a retaining portion 256. The retaining means 250 is in the form of a filament 251 and the anchor portion 252 is in the form of a fibre embedded in the first layer of viscoelastic acoustic barrier material 230. The retaining portion 256 is in the form of a loop 260. The filament 251 is formed from the same material as the batt, by the process of needle-punching in which a needle drives a batt fibre perpendicular to the batt plane and into the curing or cured first viscoelastic layer 230.

An additional layer of viscoelastic acoustic barrier material is provided in some embodiments such as FIGS. 2, 4, and 5-7. That is, the additional layer of viscoelastic acoustic barrier material 230 is affixed to the top surface 214 of the batt 212; in one embodiment by adhesive and in another embodiment by enveloping or embedding the ends of the batt fibers or retaining fibers into the curing viscoelastic material. The additional layer of viscoelastic acoustic barrier material 230 is in the form of a limp material, being a polymeric elastomer 232 impregnated with a material (not shown) in the form of calcium carbonate (not shown), or, in another embodiment, a composition including a mixture of water, gelatine, glycerine and a filler material. A non-limiting example appears below. The additional layer 230 is like the other layer, approximately 1.7 mm thick, of density 1470 kg/m$^3$.

In another preferred embodiment, the layer 230 is poured onto the needle-punched fibers of the batt so that the needle-punched fibers are enveloped or embedded in the curing or cured layer 230 for improved retention of the layer 230 by the needle-punched firbres.

A facing 234 is provided in the form of aluminium foil 236 to provide a degree of fire protection and constrained-layer damping effect for the polymeric elastomer 232 and batt 212. The facing 234 is adhered to an upper surface of the first layer of viscoelastic acoustic barrier material 230.

The needle-punch retention filament 251 holds and compresses the fibers 218 together to form a stiffer, denser batt 212 than would otherwise have been constructed. The advantage is that in operation, the mass of the first layer of viscoelastic acoustic barrier material is less likely to tear the fibers 218 away from their hold on each other. The filaments 251 tend to provide additional support along the filament 251 axis for the polyester fibers 218 and lamina 230 so that the lamina 230 does not tear the batt 212 and/or structure 210 apart. The result is that an intact barrier to incident noise is provided by the structure 210 for a longer period of time, at a lower cost than other materials.

Another second preferred embodiment of the second aspect of the present invention is shown in FIG. 4. It is a double-thickness of that embodiment shown in FIG. 3, where like numerals denote like parts.

Figure 5:
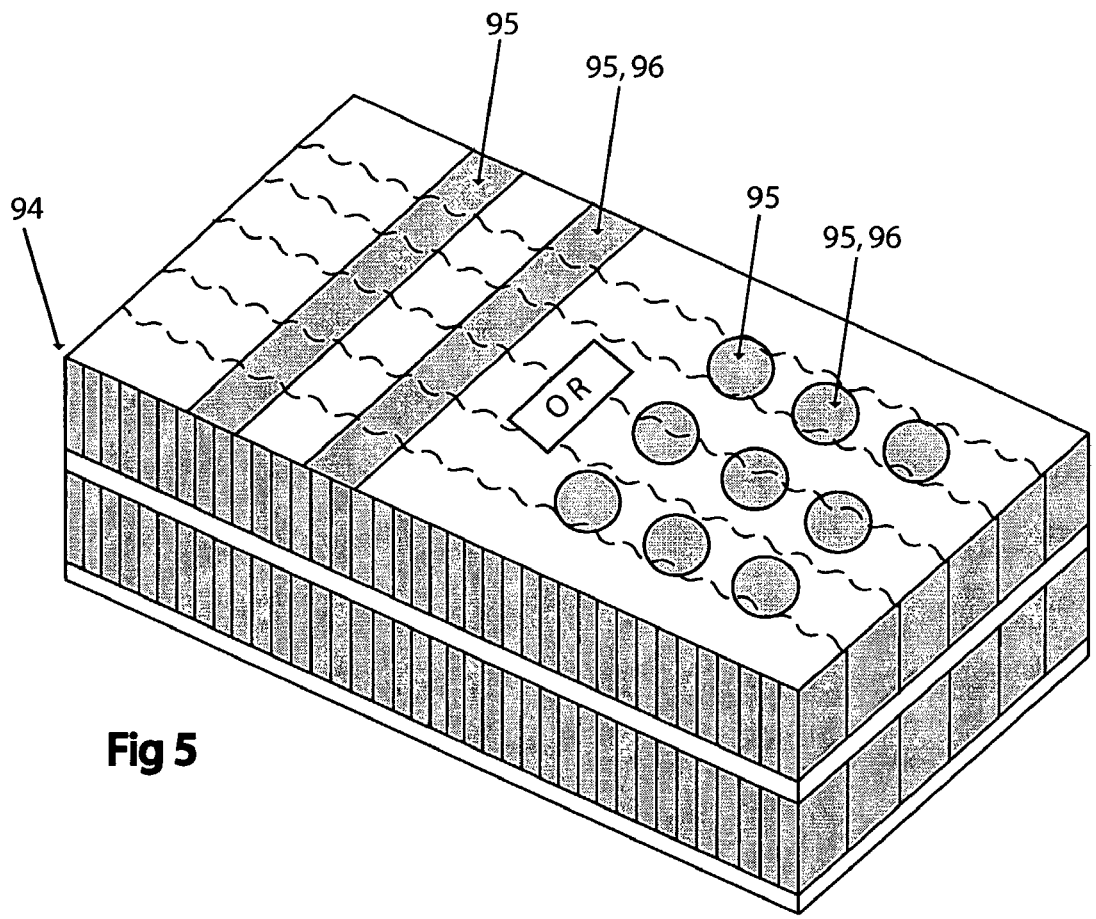
FIGS. 5 and 6 are isometric views of a laminate structure showing a tertiary layer, the tertiary layer being in the form of spaced apart geometric portions of damping material.
Figure 6:
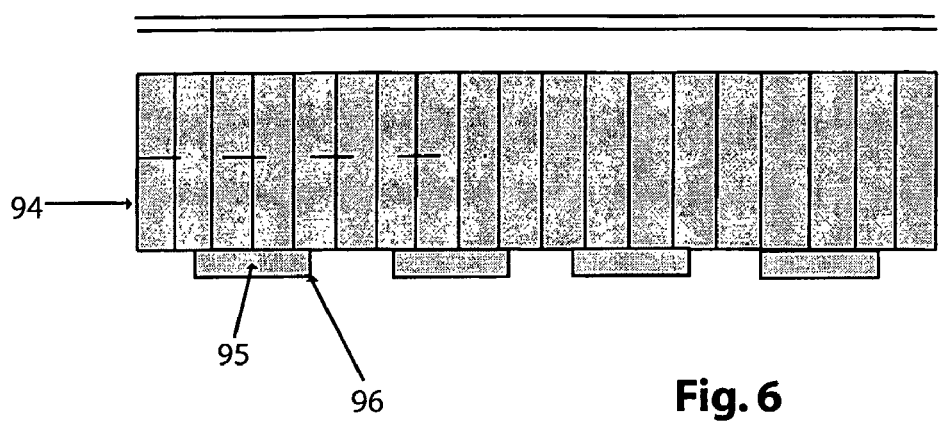

A laminate structure 94 is provided according to yet another preferred embodiment of the present invention which has an additional layer 95, the additional layer 95 being in the form of barrier/damping portions 96 and shown in FIGS. 5 and 6. In use, the additional layer 95 is pressed against the surface upon which it is mounted. The damping portions 96 are in the form of the viscoelastic acoustic material 230 in any of its preferred forms—the filled gelatine composition or the filled polymeric composition. The portions 95 and 96 are poured onto, or adhered or otherwise affixed to the batt to attach to or embed the batt fibers or retaining fibers for improved retention along the axis of the relevant fibre. The portions 96 may be affixed in strips or a matrix of pads in order to reduce mass of laminate, without appreciably reducing the retention, absorption, decoupling or damping.

Figure 7:
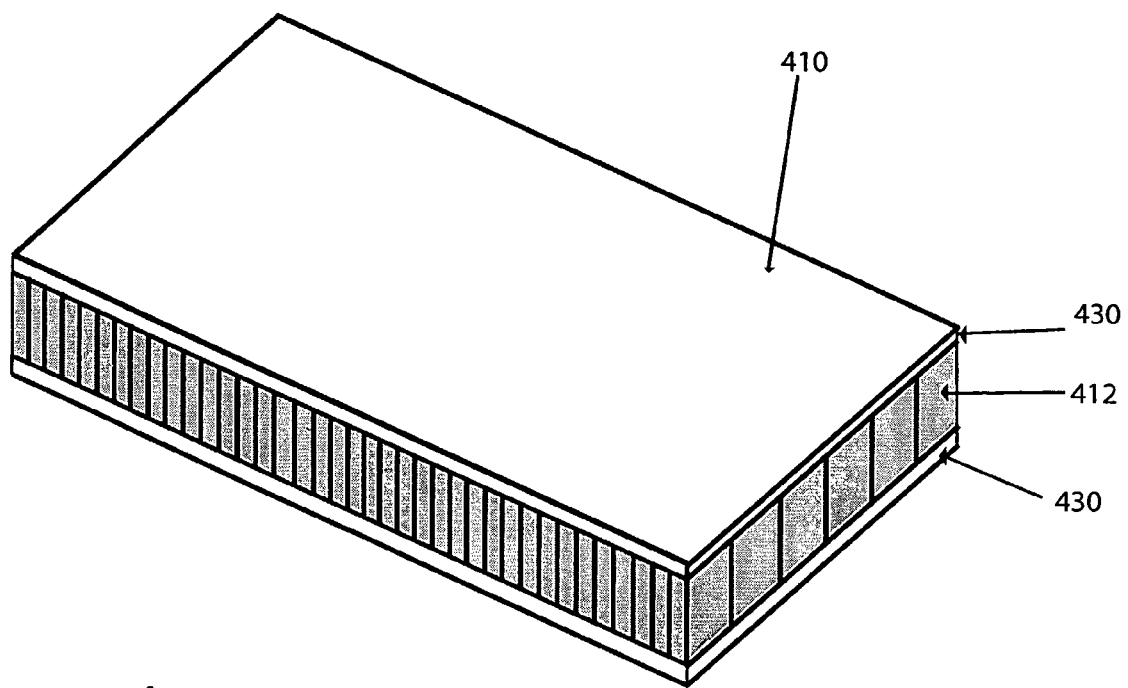
FIG. 7 is an isometric view of a preferred embodiment of the present invention, being a laminate structure having two complete secondary layers sandwiching a batt.

Turning to FIG. 7, a similar embodiment to those shown in FIGS. 3 and 4 is shown, except that there are two first layers of viscoelastic barrier material sandwiching a batt.

This panel is used in squares of approximately 300 mm×300 mm which form floor tiles. These tiles are placed underneath floor coverings to reduce peak impact forces and reduce structural vibration, reflection and thus overall $L_{eq}$.

In some applications, the specially formulated non slip viscoelastic strips or pad matrix situated on the batt are, when installed, generally in contact with a substrate in the form of rigid support (panel, pipe, bulkhead etc.), effectively increasing the decay rate of any vibration. Decay rate is the speed in dB/second at which the vibration reduces after panel excitation has ceased—the higher the decay rate, the better the acoustic performance.

One feature of a preferred embodiment of the present invention, being the composition of the first viscoelastic barrier material, will become better understood from the following example of a preferred but non-limiting embodiment thereof.

EXAMPLE 100 g of water together with 100 g of glycerine and 10 g of starch was mixed and then heated to a temperature of 85° C. 80 g of gelatine and 20 g of magnesium chloride was then dissolved into the mixture and a gel was formed. 310 g of barium sulphate was then added to the gel providing a composition with good flexibility, elasticity, tensile strength, and density with good film forming properties. The composition had the following composition by weight:

16% water;

16% glycerine;

1.5% starch;

13% gelatine;

3.5% magnesium chloride; and

50% barium sulphate.

The composition was then extruded into a flat sheet and bonded onto an aluminium film and then brought down to room temperature whereby the composition cured to form a sheet of composite material of 4 mm in thickness that showed excellent sound dampening properties.

In one embodiment, the layer or layers of viscoelastic barrier material are poured onto the end of the fibers of the batt with pouring heads (not shown), the heads being computer controlled in order to pour a broad, covering panel, or strips, or a matrix of pads.

Finally, it is to be understood that various alterations, modifications and/or additions may be incorporated into the various constructions and arrangements of parts without departing from the spirit or ambit of the invention.

The invention claimed is:

1. An acoustic laminate including:
    a first layer of viscoelastic acoustic barrier material; and,
    a sound absorbing batt composed of a plurality of batt fibers and retaining fibers wherein the retaining fibers are formed by needle punching the plurality of batt fibers, and
    wherein the retaining fibers and/or the batt fibers are embedded in the first layer of viscoelastic acoustic barrier material thereby affixing the sound absorbing batt to the first layer of viscoelastic acoustic barrier material.

2. An acoustic laminate according to claim 1 wherein the retaining fibers and/or batt fibers are embedded in the first layer of viscoelastic acoustic barrier material during curing of the first layer.

3. An acoustic laminate according to claim 1 wherein the batt fibers and retaining fibers are constructed from mineral wool, glass filaments or polyester.

4. An acoustic laminate according to claim 1 wherein the batt fibers are aligned parallel to the first layer of viscolelastic acoustic barrier material and the retaining fibers are formed to be perpendicularly oriented from the batt fibers.

5. An acoustic laminate according to claim 1 wherein a second layer of viscoelastic acoustic barrier material is provided on an opposite side of the sound absorbing batt to the first layer of viscoelastic acoustic barrier material.

6. An acoustic laminate according to claim 1 wherein the first layer of viscoelastic acoustic barrier material is of a density of approximately 1000 kg/m$^3$.

7. An acoustic laminate according to claim 1 wherein the first layer of viscoelastic acoustic barrier material is constructed from a polymeric elastomer impregnated with a particulate material.

8. An acoustic laminate according to claim 7 wherein the particulate material is calcium carbonate.

9. An acoustic laminate according to claim 1 wherein the first layer of viscloelastic acoustic barrier material is produced from a composition including water, gelatine, glycerine and a filler material.

10. An acoustic laminate according to claim 9 wherein the composition includes:
    5-40 wt % water;
    5-30 wt % gelatine;
    5-40 wt % glycerine; and,
    20-60 wt % filler material.

11. An acoustic laminate according to claim 9 wherein the composition further includes 1 to 15 wt % of a group II metal chloride.

12. An acoustic laminate according to claim 9 wherein the composition further includes calcium chloride or magnesium chloride.

13. An acoustic laminate according to claim 9 wherein the filler material has a density greater than 1 g/cm$^3$.

14. An acoustic laminate according to claim 9 wherein the filler material is barium sulphate or kaolin.

15. An acoustic laminate according to claim 9 wherein the composition further includes one or more of the following: ethylene, propylene glycols, polyvinyl alcohols, deoderisers, anti-oxidants, and fungicides.

16. An acoustic laminate according to claim 5 wherein the retaining fibers and/or the batt fibers are embedded in the second layer of viscoelastic acoustic barrier material thereby affixing the sound absorbing batt to the second layer of viscoelastic acoustic barrier material.

17. An acoustic laminate according to claim 15 wherein the retaining fibers and/or batt fibers are embedded in the second layer of viscoelastic acoustic barrier material during curing of the first second layer of viscoelastic acoustic barrier material thereby affixing the sound absorbing batt to the second layer of viscoelastic acoustic barrier material.

18. An acoustic laminate according to claim 1 wherein the acoustic laminate is mounted to an underside of a floor covering to reduce impact forces from footfall, reduce structural vibration through the floor covering, and sound/vibration reflection.

* * * * *